Dec. 7, 1937.  L. M. WALDEN  2,101,113
CONTROL UNIT FOR LINE CASTING MACHINES
Filed Feb. 16, 1933  5 Sheets-Sheet 1
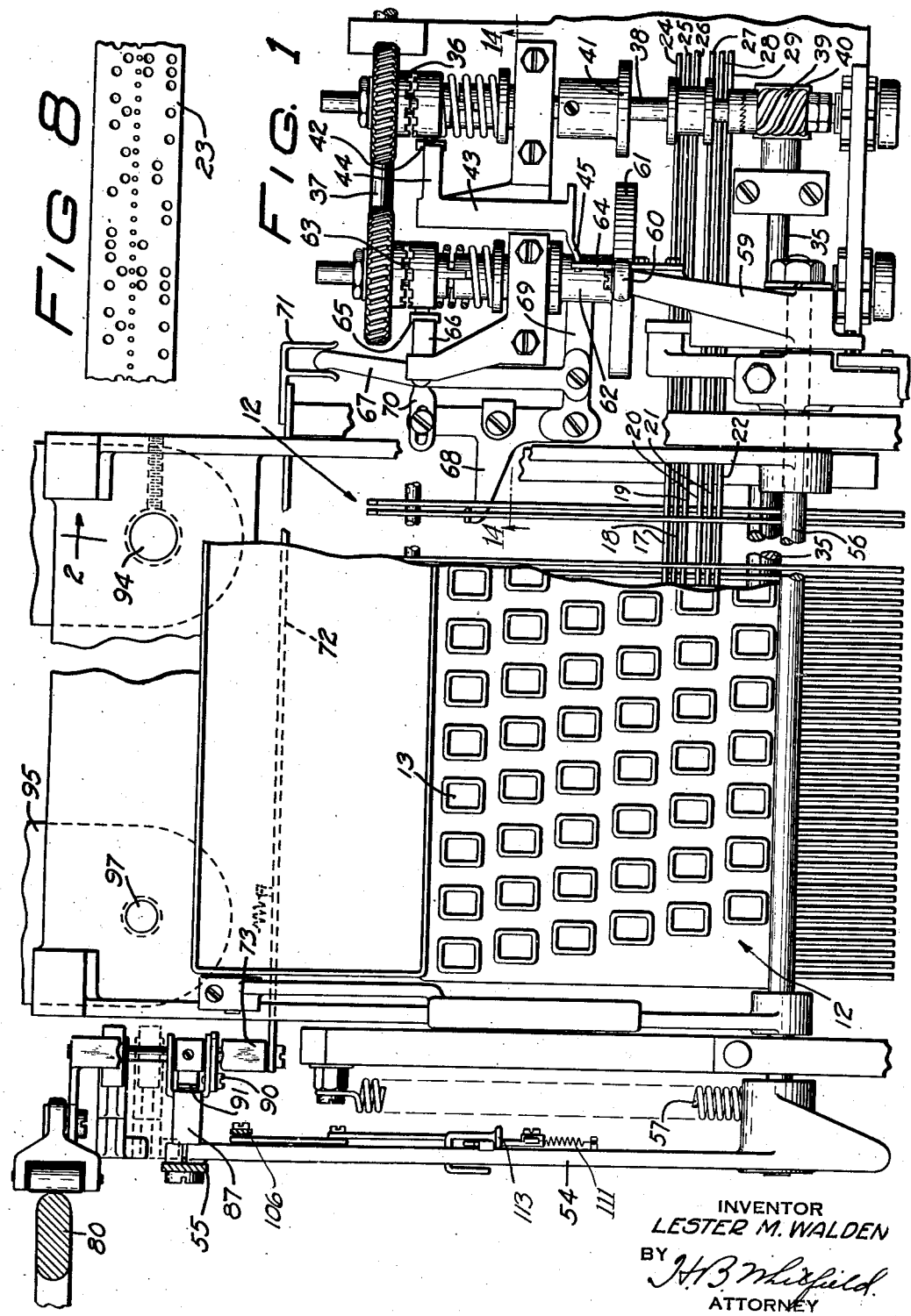
INVENTOR
LESTER M. WALDEN
BY
*H. B. Whitfield*
ATTORNEY Dec. 7, 1937. L. M. WALDEN 2,101,113
CONTROL UNIT FOR LINE CASTING MACHINES
Filed Feb. 16, 1933 5 Sheets-Sheet 2
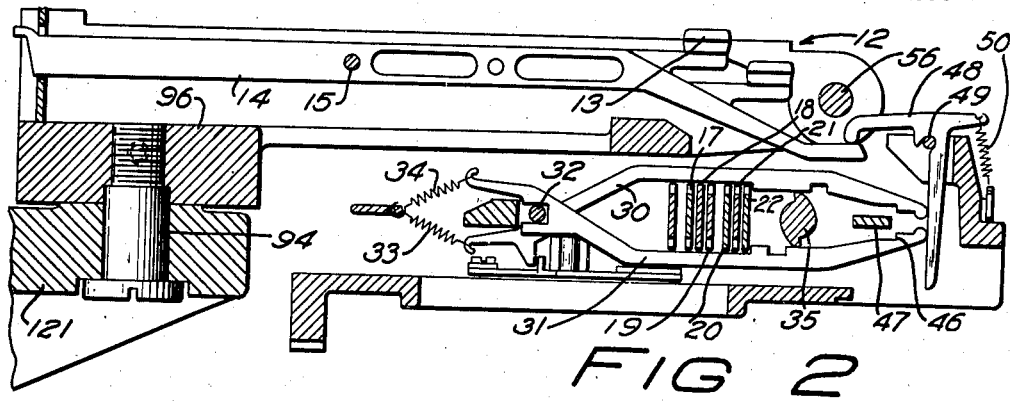
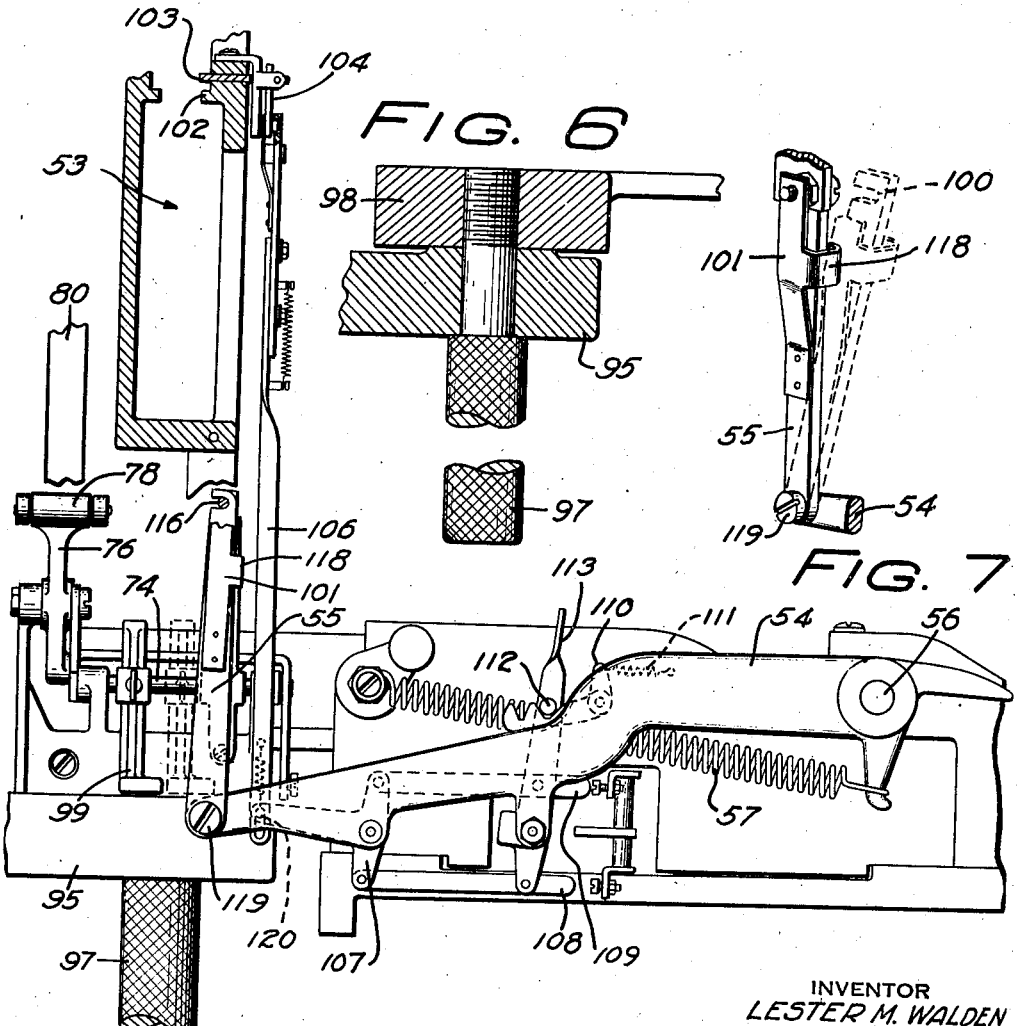
INVENTOR
LESTER M. WALDEN
BY
ATTORNEY Dec. 7, 1937. L. M. WALDEN 2,101,113
CONTROL UNIT FOR LINE CASTING MACHINES
Filed Feb. 16, 1933 5 Sheets-Sheet 3
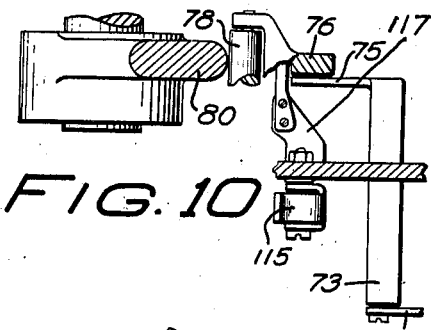
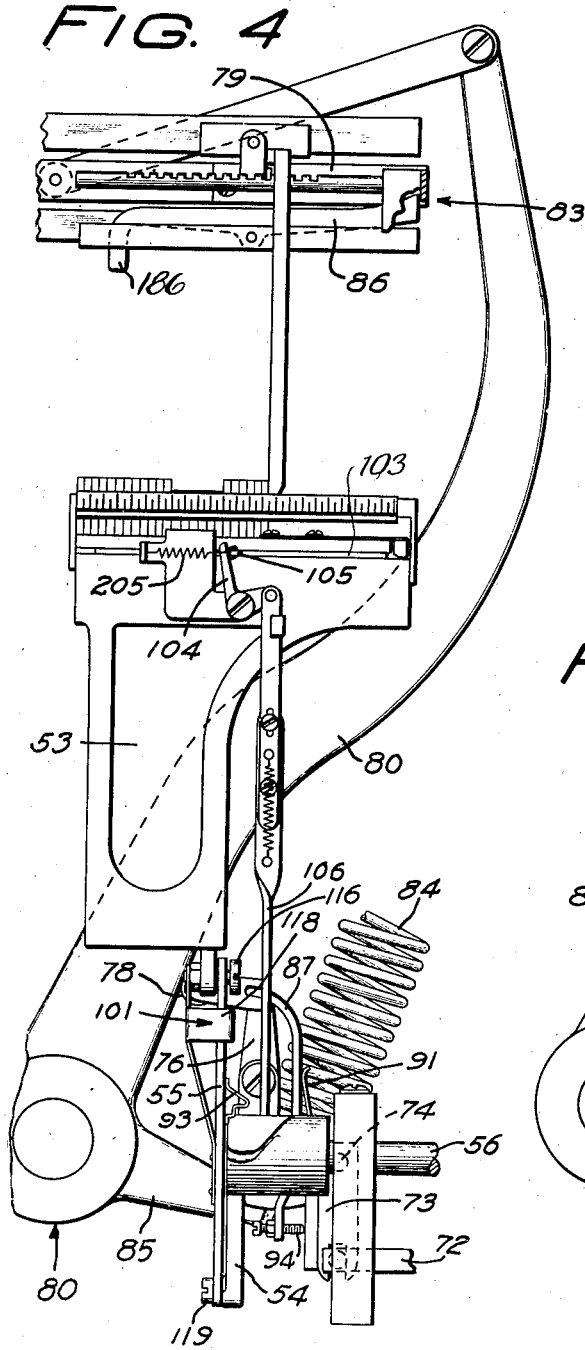
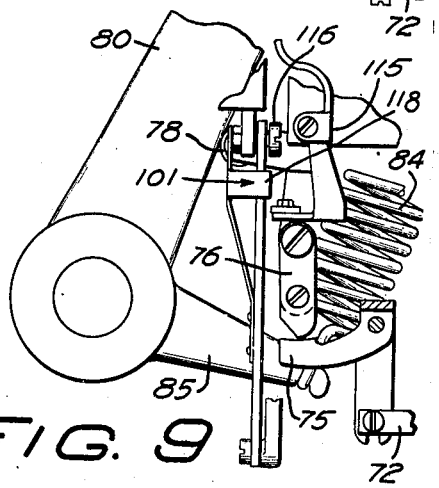
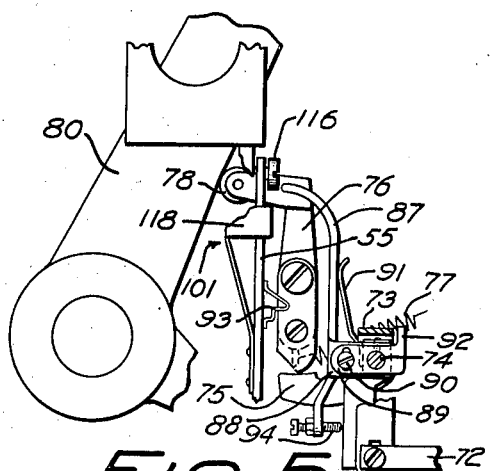
INVENTOR
LESTER M. WALDEN
BY
ATTORNEY Dec. 7, 1937.    L. M. WALDEN    2,101,113
CONTROL UNIT FOR LINE CASTING MACHINES
Filed Feb. 16, 1933    5 Sheets-Sheet 4
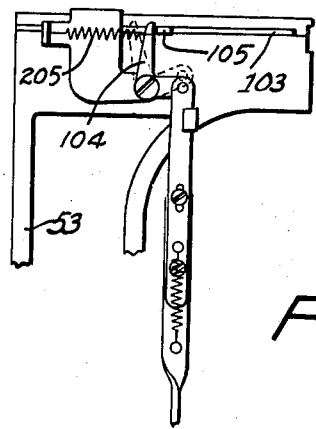
FIG. 11    FIG. 12
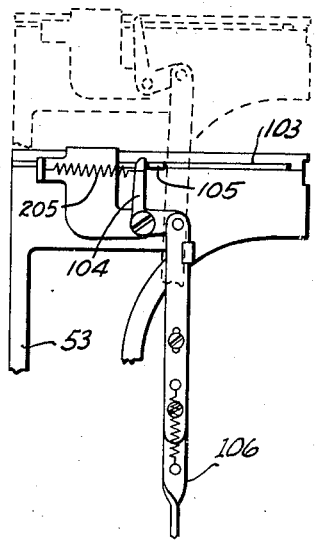
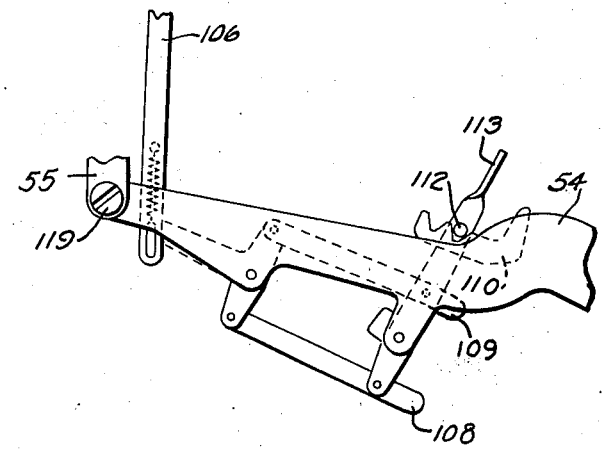
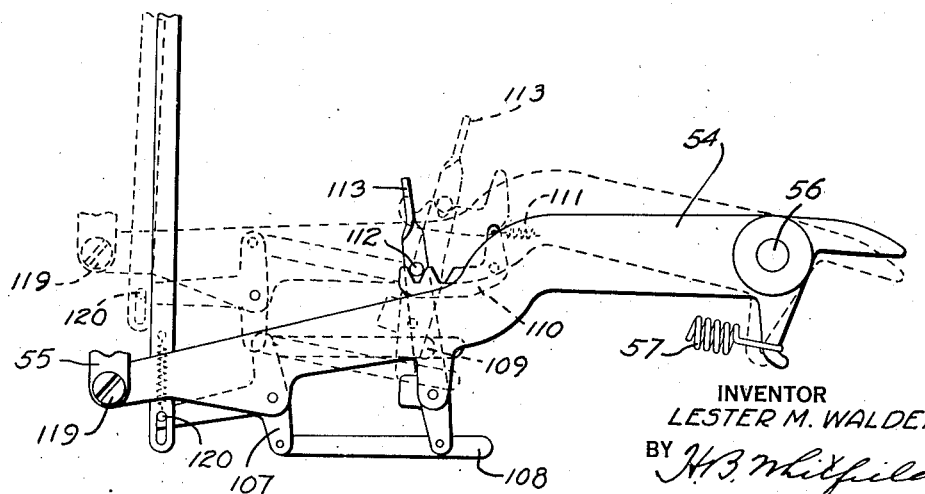
INVENTOR
LESTER M. WALDEN
BY
ATTORNEY Dec. 7, 1937.  L. M. WALDEN  2,101,113
CONTROL UNIT FOR LINE CASTING MACHINES
Filed Feb. 16, 1933   5 Sheets-Sheet 5

INVENTOR
Lester M. Walden
BY
ATTORNEY

Patented Dec. 7, 1937

2,101,113

UNITED STATES PATENT OFFICE 2,101,113

CONTROL UNIT FOR LINE CASTING MACHINES

Lester M. Walden, Chicago, Ill., assignor, by mesne assignments, to Teletypesetter Corporation, a corporation of Delaware Application February 16, 1933, Serial No. 656,984

19 Claims. (Cl. 199—18)

This invention relates to linecasting and composing machines and more particularly to means for operating such machines automatically under the control of strip perforations.

The principal object of the invention is a linecasting machine having its functions controlled automatically and provided with mechanism for suspending its operation when one of its functions is not completed.

Another object of the invention is the provision in a linecasting machine equipped for automatic operation of means for moving the rail on which the matrices are assembled to present the characters in different casting positions incident to the raising and lowering of the assembly elevator.

The above and other objects of the present invention are accomplished by the provision in a linecasting machine arranged for operation automatically in accordance with the operation of a control unit of the form and construction disclosed in copending application Serial No. 600,606, filed March 23, 1932, of mechanism for preventing the complete descent of the elevator in the event the previously assembled line of matrices has not been delivered to the line delivery slide. In the copending application referred to, there are disclosed complete details of a control unit for the automatic operation of linecasting machines, which may be referred to for a complete understanding of the operation thereof, as there is disclosed herein sufficient structure only for a full and complete understanding of the present invention.

A plurality of permutation bars are arranged to be moved permutably in accordance with perforations in a tape, and they in turn effect the selection of one of a plurality of selectable bars which, when operated through a mechanically driven actuator, function to perform various operations incident to the operation of the linecasting machine. For example, the selectable bars control the discharge from the magazine of matrices thereof and their reception in the assembly elevator. In addition, one of the selectable bars is assigned to the control of the elevator, and when selected, provided the line delivery slide is in a position to receive a new line of matrices, operates mechanism for the raising of the elevator to the line delivery position.

As is practiced in the operation of commercial linecasting machines, the line delivery slide is released when the elevator has reached the ultimate point in its travel, after which the line of matrices assembled therein is removed by the line delivery slide and the elevator descends to a position for receiving the next line of matrices.

In accordance with the structure disclosed in the aforementioned application, the perforated control tape is advanced intermittently during the assembly of the line of matrices, and is quiescent during the raising and lowering of the elevator, being again set in motion upon the complete descent of the elevator. To insure against the resumption of movement on the part of the control tape in the event the previous line of matrices has not been delivered to the level of the line delivery slide, which would otherwise occur though the elevator failed to release the line delivery slide, the present invention provides a mechanism under control of the line delivery slide for preventing the complete descent of the elevator. Specifically, the mechanism includes a lever, carried by and movable with the automatic control unit, which is fixed to a keyboard such as is provided with some commercial models of linecasting machines and which keyboard is capable of being swung about a pivot to permit accessibility to the release reeds thereof. This lever is operatively associated with the actuating arm of the delivery slide so that if the latter remains in its normal position the lever will engage a projection on the elevator when it descends, arresting it thereat and preventing the release of the control tape.

The present invention also provides for the resultant movement of a duplex rail of the elevator in accordance with the operation of predetermined selectable bars and incident to the raising of the elevator. Specifically, if it is in a position to support incoming matrices prior to the raising of the elevator, the duplex rail will first be moved to a position for avoiding subsequently discharged matrices; and before the elevator completes its upward travel, will again be moved to a supporting position for assuring that the assembled matrices will be maintained in their previously set position.

A more complete understanding of the invention may be had from the following description taken in conjunction with the accompanying drawings, wherein, Fig. 1 is a plan view of the keyboard of a standard linecasting machine and the control unit thereof with certain parts broken away to more clearly disclose the structure;

Fig. 2 is a transverse sectional view taken approximately on line 2—2 of Fig. 1, showing the elements for operating the key levers;

Fig. 3 is an end elevational view showing the assembly elevator in section and the arm by means of which it is operated;

Fig. 4 is a fragmentary front elevational view of a linecasting machine featuring the elevator and the delivery slide;

Fig. 5 is a detail elevational view of the mechanism for preventing the complete descent of the elevator in the event that it fails to release the line delivery slide;

Figs. 6 and 7 are detail views of the structure of the swinging keyboard;

Fig. 8 shows a fragment of control tape such as is utilized for the automatic operation of the control unit;

Figs. 9 and 10 are elevation and plan detail views respectively, showing modifications of the structure disclosed in Fig. 5;

Figs. 11 and 12 are detailed views featuring the operation of the automatic rail latching mechanism and showing the elevator in front elevation and the operating mechanism in side elevation so as to more clearly illustrate the progressive operation of each as related to the other;

Figure 14:
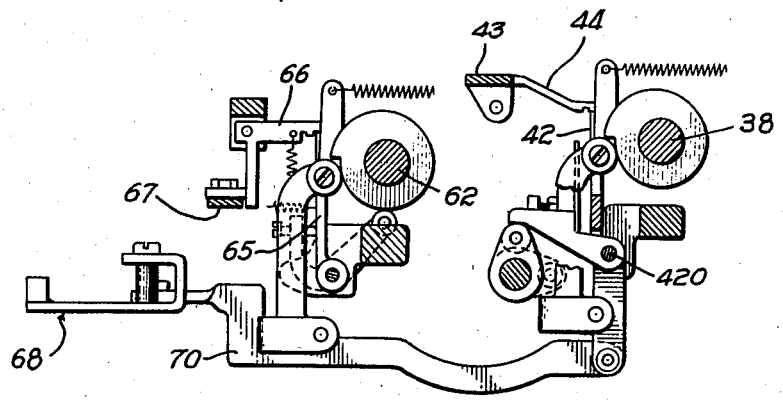
Fig. 14 is a transverse sectional view taken approximately on line 14—14 of Fig. 1.

Referring now to the drawings wherein like reference characters designate similar parts and particularly to Fig. 1, there is disclosed a keyboard designated generally by the numeral 12 which embodies a plurality of keys 13 arranged in accordance with standard linecasting machine practice and provided with keylevers 14. As disclosed in Fig. 2, the keylevers are pivotally mounted on rods 15, only one of which is illustrated and which extend transversely of the keyboard and are suitably journaled in the frame thereof. These several keylevers ultimately control the release of reeds which in turn cause the discharge of matrices individually from the magazine.

Figure 13:
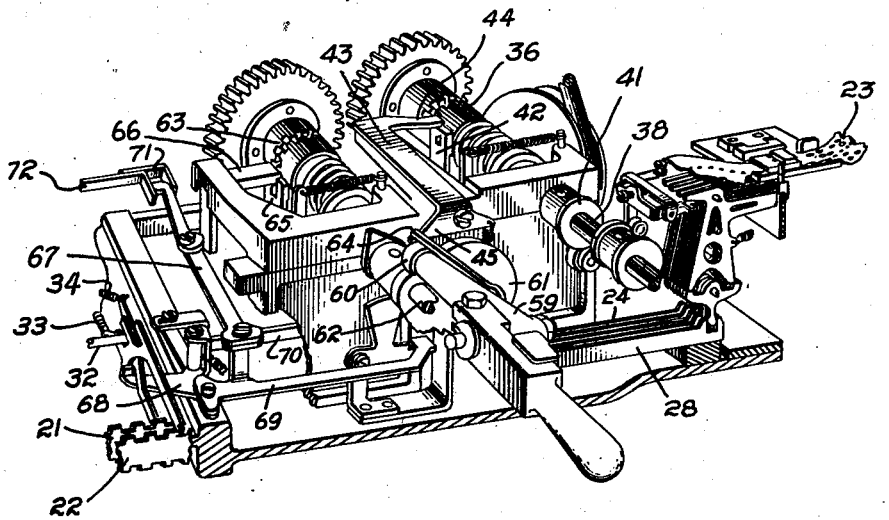
Fig. 13 is a detailed perspective view of a portion of the control unit illustrated in Fig. 1 and having portions broken away for the sake of clearness.

The control unit for the linecasting machine includes a plurality of permutation bars 17, 18, 19, 20, 21 and 22 which are adapted to be set in varying combinations in accordance with the particular perforations occurring in a transverse row upon a control strip such as disclosed in Figs. 8 and 13. Certain of the transverse perforations of the control strip are as character perforations; that is, they control the selective release of matrices while other perforations result in the performance of special functions as, for example, the operation of the elevator. The group of perforations designated as the elevator operation perforations usually follow a predetermined number of character perforations and function to control the setting of the permutation bars 17—22 inclusive for effecting a predetermined selection which results in the operation of mechanism for the raising of the elevator.

The movement of the permutation bars 17—22 inclusive in accordance with the perforations appearing in the control strip 23 is effected, as is disclosed in the aforementioned application, through the sensing operation of a feeler allotted to each row of perforations and capable of movement dependent upon the presence or absence of a perforation in the control tape 23. These feelers acting through a plurality of members 24, 25, 26, 27, 28 and 29 translate their movement to the set of permutation bars 17—22 inclusive correspondingly.

Referring again to Figs. 2 and 13, it is noted that the permutation bars 17—22 inclusive have both their edges notched and have arranged to cooperate therewith a plurality of selectable bars 30 and 31 in upper and lower alignment. These selectable bars are pivoted on a common rod 32, and are normally urged into operative association with the permutation bars 17—22 by individual springs 33 and 34 respectively, but are held away from the bars by a spreader cam 35. The spreader cam 35, which is in the form of a shaft and which extends transversely of the keyboard 12, is driven by a shaft 38 from power communicated through a clutch 36 from a continuously rotating shaft 37 and gears secured thereto. The driven portion of the clutch 36 is secured to shaft 38 on which there is mounted a worm gear 39 meshed with a pinion gear 40 on the spreader cam shaft 35 and cams 41. The cams 41, as disclosed in detail in the aforementioned application, are effective during each rotation of shaft 38 to cause the advancement of the control tape 23. However, for certain operating conditions neither the cams 41 nor shaft 38 are rotated, and consequently the control tape 23 is not advanced. In accomplishing this result, the clutch 36 is provided with a projection on its driven part which cooperates with a stop arm or lever 42 pivoted at 420, Fig. 14, for causing the disengagement of the driven part of the clutch from the driving part thereof by camming it away therefrom against the action of a coiled spring when the stop member 42 is held in the path of the projection on the driven part of the clutch 36. A cradle 43 having projections 44 and 45 is pivoted in a manner such that the projection 44 may be moved into or out of blocking position of the stop member 42 under the control of the projection 45.

When the spreader cam 35 is rotated to a position for again spreading the selectable bars 30 and 31, and the permutation bars 17—22 inclusive have been set to align transversely a new series of notches, one of the selectable bars 30 or 31 will be moved by its individual spring 33 or 34 to a position where a shoulder 46 near its foremost end will lie in the path of a common actuator 47. The actuator 47 extends transversely of the selectable bars 30 and 31, and is operated intermittently, as disclosed in detail in the aforementioned application, from a pair of cams secured to the spreader cam shaft 35. Due to the operation of the actuator 47 and the selected movement of one of the selectable bars 30 or 31, a bell crank lever 48 individual thereto, will be rocked about its pivot 49 against the action of a retractile spring 50 to depress an associated keylever 14 for effecting the automatic operation of the linecasting machine and cause the discharge of a matrix from the magazine controlled thereby.

The matrices discharged from the magazine are assembled, as is well known in linecasting machine operation, in an elevator 53, Figs. 3 and 4, which is attached to an arm 54 through a rod 55. The arm 54 is secured to a shaft 56 extending transversely of the keyboard 12 and is provided with a heavy coiled spring 57, one end of which is secured to a projection of arm 54, while the other end is secured to a spring post fixed in the frame. Secured to the opposite end of the rod 56 is an arm 59 provided with a cam roller 60 which cooperates with a cam 61 whose contour is such as to effect the movement of the arm 59 and thereby arm 54 for raising and lowering the elevator 53 in cooperation with spring 57.

There is also secured to arm 59, Fig. 1, a finger 64 which engages the projection 45 of member 43, when the arm 59 is in its normal position; that is, the position it assumes when the elevator 53 is in a matrix receiving position. Finger 64 engages projection 45 and rocks member 43 about its pivot to withdraw projection 44 out of blocking position of clutch disengagement member 42. Under such conditions which prevail during normal line composing operation, the driven portion of clutch 36 will be moved by its spring to engage the driving portion thereof. When the elevator reaches its lowermost position after the delivery of a line of matrices to the line delivery slide, the finger 64 will thus engage projection 45 and cause the operative association of the portions of clutch 36 and the resultant rotation of cams 41 which in rotating will, as previously described, cause the intermittent advancement of tape 23.

As disclosed in Fig. 1, cam 61 is secured to a shaft 62 which is driven through a clutch 63 from power received from the continuously rotating shaft 37. The clutch 63 is of the single revolution type; that is, after it is released, it completes one revolution when a mechanism is effective for again causing its disengagement. According to the present structure, a stop or disengagement arm 65 cooperates with a projection on the driven portion of the clutch 63 to separate the parts thereof immediately prior to the completion of one cycle of rotation. The arm 65 is of the same structure and operation as arm 42 of clutch 36 and is normally adapted to withdraw the driven portion of the clutch 63 and hold it out of engagement with the driving portion thereof by a blocking member 66. A lever 67 is dually controlled; that is, it requires the joint operation of two other mechanisms for causing it to move member 66 out of engagement with stop arm 65 and thus permit the engagement of the driven portion of the clutch 63 with the driving portion thereof. One of these controlling mechanisms includes a T-shaped lever 68 to one arm of which is secured a latch member 69 while the other arm has fixed thereto a link 70 which is connected to the clutch release lever 42 as best illustrated in Fig. 14. The vertical portion of the T-shaped member 68 cooperates with one of the selectable bars 30 or 31, so that when the bar allotted thereto is operated through the actuation of the actuator 47, the T-shaped lever 68 will be rotated about its pivot and the latch member 69 will be moved to its latched position concurrently moving lever 67 pivotally carried by it. However, the operation of the T-shaped lever 68 alone is not sufficient to move member 66 for releasing the stop arm 65 which would permit the driving engagement of clutch 63.

The other end of lever 67 is engaged by a bifurcated portion 71 of a transversely extending bar 72 which is located at the rear of the control unit and extends to the left hand side of the machine as viewed in Fig. 1. The opposite end of the bar 72 is secured to one arm of a U-shaped member 73 pivoted on a rod 74 and provided with a projection 75, Figs. 9 and 10. The projection 75 cooperates with one end of a pivoted lever 76 normally urged by a spring 77 in a counterclockwise direction so that a roller 78 carried by the upper end thereof engages the delivery slide operating arm 80 when the line delivery slide 79 is in its normal position for receiving a line of matrices from the assembly elevator. With the line delivery slide arm 80 in the position shown in Figs. 4 and 5, the projection 75 will be depressed through the lever 76, the bar 72 will be moved to the right as viewed in Fig. 1, and the lever 67 will be in a position to complete the operation of member 66 augmented by latch bar 69 in response to the selective operation of the T-shaped lever 68. However, if the line delivery slide 79 and its arm 80 are not in a position such that the lever 76 is operated to depress projection 75 of the U-shaped member 73, the bar 72 will be in its left hand position, and consequently the lever 67 will not be in a position to operate member 66 and effect the release of stop arm 65 when the T-shaped lever 68 is selectively operated in response to the movement of its selectable bar.

Upon the engagement of the driven portion of clutch 63 with the driving portion thereof, cam 61 will be rotated through one complete cycle of rotation, and in so rotating will rock and rotate shaft 56. Inasmuch as elevator lifting arm 54 is secured to shaft 56, it likewise will be rotated, and the elevator 53 with the assembled line of matrices will be moved to a position for releasing the line delivery slide, which will then remove the line of matrices from the elevator.

The line delivery slide, which is indicated generally by the numeral 83, Fig. 4, is operated by energy stored in a spring 84, one end of which is secured to a fixed spring post (not shown) while the other end is secured to arm 85 integrally formed with the line delivery slide operating lever 80. Slide 83 is retained in a line receiving position normally, however, by means of a latch 86 which has a depending portion 186 lying in the path of the elevator 53, so that upon the arrival of the elevator at its upper level the latch 86 will be engaged thereby and the line delivery slide will be released for movement by the energy of spring 84.

There may, however, be instances when the movement of the elevator will be insufficient to cause the operation of latch 86 and the release of the line delivery slide, in which case the line of matrices carried by the elevator would not be removed and the elevator would return to its line receiving position where it would be eligible again to receive the next line of matrices, as released by the restarting of the perforated tape 23, due to the engagement of finger 64 with projection 45 and the association of the portions of clutch 36 in driving relation for rotating cam 31. To guard against this possibility and to prevent the restarting of the tape 23, an uncinate member 87 formed with a pair of ears 88 is journaled on rod 74 and adjustably secured to a member 89 by means of a screw and slot connection 90. The member 89 is keyed to rod 74, and the member 87 is urged counterclockwise about the rod 74 by a flat reed spring 91. The curvature of member 87 is especially provided so that in acting as a stop for the elevator 53 when it descends fully loaded with matrices, as will be described, it may not do so with abrupt and violent reaction but will instead yieldingly absorb a portion of the force while yet affording a positive interception for the rapidly descending elevator.

Though member 89 is illustrated as being separate and adjustable with respect to the ears 88 of stop member 87, it should be understood that this is so constructed for the purposes of assembling convenience only and that it might operate equally well if formed integrally therewith. The vertical lug 92 of member 89 cooperates with the horizontal portion of U-shaped member 73 so that when the latter is in its extreme clockwise position it engages lug 92 imparting a similar rotation to member 87 thereby withdrawing its extremity from the path of abutment 93 carried by the elevator lifting rod 55. This condition prevails when the slide arm 80 has left its normal position and is found anywhere else in its reciprocative course, for only while it is in transit may lever 76 concede to the inclinations of its spring 77 and be moved away from engagement with the elevated portion of extension 75. During other times when the delivery slide arm is in its normal position coincident with an inoperative condition of the elevator or if operated an incomplete ascent thereof, arm 80 abuts roller 78 of lever 76 holding the opposite end thereof against the elevated portion of extension 75. This keeps the horizontal portion of U-shaped member 73 away from lug 92 permitting stop member 87 to be influenced by the flat spring 91 which always tends to urge it into effective stopping position. Member 87 is formed with a lower extending portion within which is supported a stop screw 94 for limiting its movement toward effective stopping position, thereby making it possible to critically adjust its position.

As is more clearly disclosed in Fig. 5, the flexuous abutment 93 has its upper surface inclined with respect to connecting link 55, and its extremity lies in the path of the upper free end of member 87. Consequently, as the elevator 53 is raised, the upper surface of abutment 93 will engage the end of member 87 and will deflect it against the tension of spring 91. Immediately, however, that abutment 93 passes member 87, spring 91 is again effective and holds the foremost edge of member 87 in its path. When the elevator 53 fails to reach its upper level where it may engage hook 86 and as a result the line delivery slide 83 is not operated, member 87 will engage the lower side of flexuous abutment 93 during the descent of the elevator 53 and prevent its further descent. The resilient tendencies of member 87 are augmented by the cushioning effect of abutment 93 which is preferably formed of spring material, thereby aiding further in preventing abrupt and violent arrest of the loaded elevator. With the descent of the elevator 53 arrested, cam arm 59 will remain in a position such that the finger 64 carried thereby will be short of engagement with projection 45 of member 43, leaving it in a position to cause projection 44 to continue to block clutch disengagement member 42 and prevent the reengagement of clutch 36. The cams 41 will thus remain quiescent, and the tape 23 will not be advanced.

During regular operation, however, where the elevator 53 arrives at its upper level and hook 86 is engaged, the line delivery slide arm 80 will be released, and the assembled matrices in the elevator 53 will be removed therefrom for delivery to the casting position, allowing the elevator to descend to a matrix receiving position empty. With the line delivery slide 79 operated to deliver the line of matrices, the arm 80 will be out of engagement with roller 78, and lever 76 will be rotated in a counterclockwise direction about its pivot by spring 77 and the U-shaped member 73 will also be rotated in a clockwise direction. The horizontal portion of the U-shaped member 73 will engage projection 92 of member 89; and since member 89 is secured to member 87, the latter member will be rotated so that its upper end lies out of the path of the abutment 93. Consequently, upon the return of the elevator 53, it will not be arrested, but will be allowed to complete its descent.

Detachment for swinging keyboard

As previously mentioned, some commercial types of linecasting machines are provided with keyboards that may be swung laterally for affording access to the posterior mechanism as disclosed in the drawings. A pivot stud 94, Figs. 1 and 2, extending through portion 121 of a stationary part of the frame is anchored to the base casting 96 of the keyboard unit 12. With this construction, the keyboard unit 12 may be swung about the pivot stud 94, but in order to lock the keyboard unit in position so that the keylevers 14 are operatively associated with their reeds, a bolt 97 provided with a knurled head extends through a portion 95 and is threaded to engage the base casting 96 of the keyboard unit 12 as shown in Figs. 1 and 6.

To safeguard against the movement of the elevator operating arm 54, when the keyboard unit 12 is pivoted out of operative position, a member 99 slidably mounted on rod 74, Fig. 3, is provided, which when moved to the dotted line position will engage the end of arm 54 and hold it against the action of spring 57. Also to expedite the disjunction of certain connecting members of the keyboard unit 12, the link 55, Fig. 7, is connected to the elevator 53 by means of a horizontally slotted portion 100 and a retaining spring 101. The slotted portion 100 engages the neck of screw 116 secured to the elevator 53, and is held in that position by spring member 101 which is apertured to receive one end of the screw and by means of a clip 118 integrally formed therewith to anchor itself and the screw 116 against incidental displacement.

Shiftable rail control

In line composition the matrices are sometimes assembled at two levels for the purpose of assorting two styles of type to be presented for casting. To permit this the elevator 53 is equipped with a fixed lower rail 102, Fig. 3, and a movable upper rail 103. The rail 103 is moved longitudinally through a bell crank lever 104 which co-operates with a projection 105 on the rail 103 and is fastened to a vertically extending member 106, Fig. 11, which has its opposite end secured to a T-shaped member 107. The latter member 107 is selectively operated through links 108 and 109 in accordance with the selective movement of each of two selectable bars 30 or 31 as is fully disclosed and described in copending application Serial No. 615,592, filed June 6, 1932. Inasmuch as the selective operation of the rail 103 does not form a part of the present invention, reference should be had to the just mentioned copending application for a complete understanding of this part of the apparatus. However, it has been found desirable to move the rail 103 concurrently and incidentally to the raising and lowering of the elevator 53. In order to accomplish this feature, a detent latch 110 pivoted to arm 54 and urged by a spring 111, Figs. 3 and 10, is provided. This latch 110 engages a pin 112 secured to lever 113 which is pivoted to members 108 and 109.

As more particularly illustrated in Figs. 11 and 12, with the lifting arm 54 in the downward position, lever 113 is capable of two operative conditions which will be referred to for convenience as the bold and roman positions, the former corresponding to the full line position as illustrated in Fig. 11, and the latter to the position as illustrated in the third condition of operation of Fig. 12 to be referred to presently. Lever 113 is selectively moved into each of its positions, as described above, by the operation of one or another of two selectable bars. During its bold position, lever 113, through its parallelogrammatic connection to T-lever 107, depresses pull rod 106, moving the shiftable rail 103 rightwardly whereat it will support subsequently received matrices, but with the lever 113 in the roman position, T-lever is moved to its clockwise extremity, thrusting rod 106 upwardly and permitting rail 103 to be moved into its leftward position for rejecting or avoiding subsequently received matrices.

In addition to its utility as a means for selectively receiving matrices in one or another of two possible positions, rail 103 also serves to lock up such matrices as have already been assembled, so that the sudden stop after the raising of the elevator and its characteristic vibrational effects may not disturb the assembled matrices. For this reason it is desirable to have rail 103 presented in its rightward position at the conclusion of the upward travel of elevator 53 and to accomplish this without any manifest control such as is otherwise necessary to effect a movement of rail 103.

This object is accomplished by providing that the radial distance between shaft 56, about which arm 54 is pivoted, and the pivot 119 shall be slightly greater than the distance between said shaft and the lost motion connection 120 between T-lever 107 and rail shift rod 106. Thus, since link 55 and rod 106 are both connected to the elevator 53 and for that reason tend to move through the same distance the effect of rod 106, the lower end of which connects with the shorter radius, is to impart the differential motion to its associated T-lever 107. In so doing, it must overcome the detent resistance of spring 111 while pin 112 passes into the roman position notch of detent 110, but as the latter does so it passes over the detent hump and descends on the declining side where through the influence of spring 111 it hastens to surpass the movement of arm 54, momentarily lifting rod 106 and partially returning the shiftable rail 103 as illustrated in dotted lines in Fig. 11.

Since, as a matter of practice, roman line composition is more frequently used than is bold line composition, provision is made for invariably returning the rail to its roman position, as illustrated in Fig. 3. This is accomplished through the medium of detent lever 110 as illustrated in broken lines in Fig. 11. Supposing the last condition of lever 113 at the conclusion of a line of composition, to have left it in the bold position, as illustrated in solid lines in this figure; when arm 54 rises to the intermediate position (in dotted lines), due to the difference between the two aforedescribed radii there is effected the pull on rod 106 as described in the last paragraph and also the return of lever 113 to its roman position by overcoming the detent action of lever 110. At this particular instant, lever 113 is found substantially in the position as illustrated in dotted lines in Fig. 11, but upon completing its movement pin 112 is seated completely in its roman detent position as illustrated in Fig. 12. Observing now the movement of shiftable rail 103, it will be noted that during the intermediate position, rail 103, due to the accelerating action of lever 110 has partially returned towards its roman position, being prevented from completing its movement because it is then overtaken by the action of the raising arm 54. By the time that arm 54 arrives at its ultimate position Fig. 12, the differential of movement has been so far increased as to reset rail 103 to its bold position.

It has been found that this vacillatory movement of rail 103 during the transit of elevator 53, assists in settling matrices which may not otherwise have been fully received in their respective positions, and also assisting in some cases in effectuating the shifting of rail 103 where it might otherwise be obstructed by the interference of such improperly settled matrices.

Thus, rail 103 is presented in its bold position toward the conclusion of the operation of the elevator, at which time only its utility is essential, particular attention being directed to the fact that its disposition in its bold position is minimized so as to present the rail in its most frequently used position automatically. It is not necessary for maintaining and securing the assembled line of matrices that its movement into bold or lock-up position be effected until just before the arrival of the elevator to its upper extremity.

As was described in connection with the securing of link 55 to the elevator 53, vertically extending member 106 is similarly connected to bell crank lever 104 so as to make it readily detachable for purposes of swinging the keyboard.

*Modifications*

Referring now to Figs. 9 and 10 wherein a modification of the structure shown in Fig. 5 is disclosed, a lever 115 is pivoted to the frame of the linecasting machine in a manner such that its upper portion, which is preferably of reverse curve formation so as to afford an uncinate interception for the same object as explained in connection with the preferred form 87, lies in the path of screw 116. The lower end of member 115 is secured to a horizontally projecting member 117, Fig. 10, which lies in the path of pivoted lever 76. In the form shown in Figs. 9 and 10, the lever 76 whose position is dependent upon the position of line delivery slide arm 80 in turn determines the position of member 115. If the line delivery slide is in its normal position, the member 115 will be maintained by lever 76 in a position such that its free end lies in the path of screw 116 so that upon the descent of the elevator this screw will be engaged and the further descent of the elevator will thereby be prevented. Otherwise, or with the delivery slide arm having been released, lever 76 engaging member 117 will rotate lever 115 clockwise to its extremity of movement, thereby withdrawing the engaging edge thereof from the path of screw 193 during the descent of the elevator.

Although the invention has been disclosed and described with reference to a particular machine, it is of course obvious that various modifications thereof may be made without departing from the spirit and scope of the present invention.

The invention claimed is:

1. In a line composing machine, an automatic control unit, an elevator for raising assembled matrices initiated by said unit, means for arresting the operation of said unit during the transit of said elevator and until it returns to a normal position, and means for permitting a partial return only of said elevator and for thereby preventing the resumption of operation of said unit in the event of an unsuccessful attempt at operation of said elevator.

2. In a line composing machine, a composing mechanism, a conveying mechanism for carrying assembled matrices from said composing mechanism to a casting position and for returning empty to said composing mechanism, an automatic control unit for operating said mechanism, means for suspending the operation of said unit during the transit of said conveying mechanism, and means for intercepting the consummation of the return movement of said conveying mechanism in the event of a non-delivery or miscarriage thereof in its operation.

3. In a line composing machine, a composing mechanism, a first conveyor, a second conveyor, an automatic control unit for operating said mechanism and said first conveyor, means responsive to a predetermined forward operation of said first conveyor for operating said second conveyor, means responsive to a full return operation of said first conveyor for permitting the operation of said unit, and means under control of said second conveyor for intercepting the final portion of the return movement of said first conveyor for thereby preventing the operation of said unit.

4. In a composing machine, an elevator for raising assembled matrices from a composing level to a casting level, a conveyor for relieving said elevator of its matrices upon its arrival at the casting level, and a blocking member effective toward the final portion of the descent of the elevator for preventing the return of said elevator to the composing level if through its failure to reach the casting level it has not been relieved of its load of matrices.

5. In a linecasting and composing machine, an elevator for raising assembled matrices from a composing level to a casting level, a conveyor for removing said matrices from said elevator and conveying them horizontally, a hook operated during the final portion of upward movement of said elevator for releasing said conveyor, means for returning said elevator to the composing level, and a blocking member controlled by the operation of said conveyor for intercepting the return of said elevator to the composing level at a point just previous to said level.

6. In a linecasting machine, an elevator for conveying assembled matrices from a composing level to a casting level, an automatic control unit responsive to stored signals for operating the linecasting machine including said elevator, means for suspending the operation of said unit during the operation of said elevator, and a blocking member spring-urged away from and positively urged into effective position for preventing the full return of said elevator in the event of a miscarriage in the operation thereof.

7. In a linecasting and composing machine, a composing mechanism, a conveying mechanism including an elevator and a lateral conveyor, an automatic control unit including a driving apparatus for operating said composing mechanism, a driving apparatus for operating said conveying mechanism, alternative control means including a dually controlled lever responsive to a predetermined condition of said conveyor and to a selective response of said unit for initiating said conveying mechanism driving apparatus, and a dually controlled means responsive to a predetermined condition of said elevator and to a condition of operation of said conveying mechanism driving apparatus for initiating the operation of said composing mechanism driving apparatus.

8. In a linecasting and composing machine, a conveyor including an elevator and a delivery slide, an automatic control unit comprising signal responsive apparatus, composing machine operating mechanism and elevator operating mechanism, means under the control of certain signals and conditioned upon a predetermined phase of said delivery slide for suspending the operation of said composing machine operating mechanism and initiating said elevator operating mechanism, means conditioned upon a certain phase of said elevator for restarting said composing machine operating mechanism, and means predicated upon a successful cycle of operation of said elevator for permitting it to assume the aforesaid phase.

9. In a line composing machine, an assembling elevator into which are received selectively released matrices, a signal controlled operating mechanism, a supporting rail in said elevator shiftable in accordance with alternative signals received by said mechanism either to support or avoid incoming matrices, lifting mechanism for said elevator, and means for moving said rail to its supporting position during the final portion of the upward movement of said lifting mechanism independently of said signal controlled mechanism.

10. In a line composing machine, an assembling elevator, a shiftable supporting rail, a power driven arm for lifting said elevator, a pendant arm associated with said lifting arm, and detented connection between said rail and said pendant arm whereby differential motion between the movement of said arms corresponds in its limits to a pair of detent positions of said connection.

11. In a line composing machine, an assembling elevator, a rail carried by said elevator shiftable into either of two positions for accordingly supporting or rejecting received matrices, means for shifting said rail into either of its positions under control of signals while the elevator is in assembling position, means for invariably shifting said rail to supporting position coincident with the raising of said elevator, and means operative where the rail is already in supporting position to first move it toward rejecting position then to supporting position coincident with the raising of said elevator.

12. In a line composing machine, an assembling block, an elevator for raising said block from a composing level to a casting level, a rail shiftable between two positions for accordingly receiving incoming matrices, one of said positions being also effective to lock assembled matrices, an elbow connection for raising said elevator, a foreshortened elbow connection for shifting said rail by the differential motion concurrently with the movement of said first mentioned elbow connection, from unlocked to locked position, and detent means carried by said first mentioned elbow for retaining said second mentioned elbow in either of its set positions.

13. In a line composing machine, a composing mechanism, a conveying mechanism and a supporting member including means for supporting a plurality of keylevers for controlling said composing mechanism and a lifting arm for operating said conveying mechanism, a pivotal support for said supporting member about which it may be swung to afford accessibility to said composing mechanism, securing means for maintaining said support in operative position comprising a stop member for said support, and a hooked connecting link associated with said arm, and a spring detainer for preventing accidental disjunction of said hooked connecting link.

14. In a line composing machine, an elevator, means for assembling matrices on said elevator, means for raising said elevator from assembling position to an upper level, and a stop member operative to be interposed beneath said elevator for preventing its full descent in the event of ineffective delivery operation including an offset curved portion for affording resiliency to break the fall of said descending elevator.

15. In a line composing machine, a conveying mechanism including an elevator, a delivery slide and a blocking member effective to intercept said elevator during its descent and yieldable thereto during its ascent, means responsive to a predetermined condition of said delivery slide for withdrawing said member from the path of said elevator, and a resilient abutment portion on said elevator for cooperation with said member.

16. In a line composing machine, a conveying mechanism including an elevator and a delivery slide, automatic means for raising said elevator, a release member responsive to termination of movement of said elevator for releasing said slide, a blocking member normally in the path of said elevator, means conditioned by the operation of said slide for withdrawing said member from the path of said elevator, and a resilient abutment portion adapted to engage said member when the latter is disposed in its path.

17. In a line composing machine, a control board, a pivotal support for said board about which it may be rotated for affording posterior accessibility, an elevator lifting arm, a spring element for augmenting the operating power applied to said lifting arm, and a blocking member to be interposed in the path of said lifting arm for maintaining it in loaded position while it is disconnected from the mechanism operated thereby.

18. In a line composing machine, an assembling elevator for receiving selectively released matrices, a supporting rail in the said elevator shiftable in accordance with predetermined control signals either to support or avoid incoming matrices, lifting mechanism for said elevator comprising a vertically moving link and a lever pivoted thereto in perpendicular relation, a supporting rail operating rod also pivoted to said lever in parallel relation to said link, means for normally moving said rail to its avoiding position, and means including said rod through its association with said lever and link for moving said rail to its supporting position during the upward movement of said elevator.

19. In a linecasting and composing machine employing a shiftable rail in a matrix assembling elevator, the method of settling assembling matrices during transit from line composing to line casting levels comprising the steps of shifting the rail in either or both directions during ascent so that the assembled matrices are agitated regardless of the previous condition of the rail.

LESTER M. WALDEN.